June 12, 1923.
M. J. CLAUSEN
TESTING DEVICE
Filed April 12, 1922
1,458,272
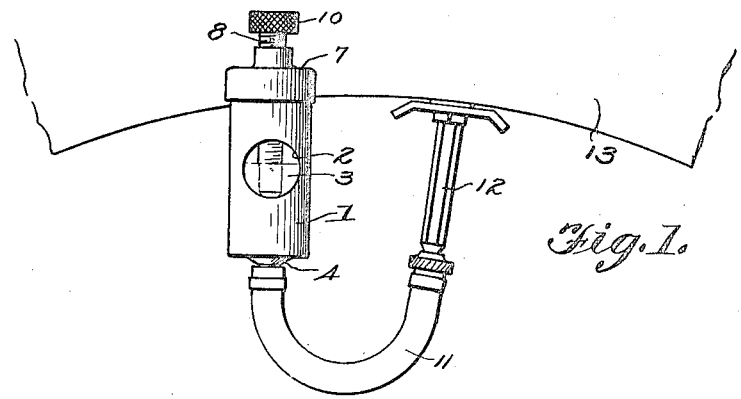
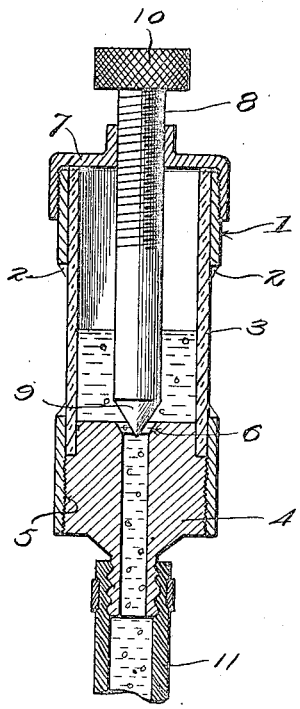
Inventor
Martin J. Clausen.
By Fred P. Gorin
Attorney Patented June 12, 1923.

1,458,272

UNITED STATES PATENT OFFICE.

MARTIN J. CLAUSEN, OF SEATTLE, WASHINGTON.

TESTING DEVICE.

Application filed April 12, 1922. Serial No. 551,784.

*To all whom it may concern:*

Be it known that I, MARTIN J. CLAUSEN, a citizen of the United States of America, residing at Seattle, in the county of King and State of Washington, have invented certain new and useful Improvements in Testing Devices, of which the following is a specification.

The invention relates to an improvement in testing devices, and particularly to an instrument adapted to be removably connected to the valve stem of a pneumatic tire, whereby to visibly indicate the leakage of air passed the valve of such tire.

The instrument includes a casing adapted to contain water or a similar fluid, and a flexible connector leading from the casing and designed to be temporarily connected with the valve stem, the casing being provided with a manually operable valve, whereby the water column may be open at will to any air leaking passed the air valve of the tire, such leakage being thus evidenced by bubbles rising thru the water.

As an important detail of the instrument described, the provision of the flexible connector is highly important, as thru the use of such connector, proper connection with the tire valve may be had at any time and yet the casing maintained upright and above the outlet of the valve, in order to permit rising of the air bubbles thru the water.

In the drawings:

Fig. 1 is a view in elevation illustrating the use of the testing device when the tire valve stem is pointing downward.

Fig. 2 is an enlarged view, illustrating the use of the device, the latter being shown in vertical section.

The device comprises a metallic casing 1 formed with opposed side openings 2. A glass lining 3 snugly fits the interior of the metallic casing, this lining of course closing the side openings 2. The casing 1 is provided with a depending stem 4, the bore of which communicates with a bore 5 longitudinally of the casing and terminating at its upper end in a valve seat 6. The upper end of the casing is provided with a cap 7, in which is mounted for threaded adjustment, a stem 8 terminating at its lower end in a conical valve formation 9 arranged to cooperate with the seat 6. The valve stem 8 is provided beyond the cap 7 with an enlargement 10, whereby the valve 9 may be properly adjusted with respect to the seat 6.

As an essential and important part of the described testing device, there is provided a short length of flexible tubing 11, one end of which is adapted for non-leaking though removable connection with the lower end of the stem 4, while the opposite end of the flexible tubing 11 is adapted to be forced on the usual valve stem 12 of a tire 13.

In use, it is intended that the casing shall be filled or substantially filled with a fluid, such as water, which is accomplished by raising the valve 9 from its seat and admitting water thru the stem 4 with the casing inverted. When the casing is full, the valve is closed. In the use of the device as a leak detector, the free end of the flexible tube 11 is connected with the stem 12 of the tire valve. The valve stem 8 is then raised to open the valve 9, and the water in the casing permitted to flow down to the tire valve stem. A column of water is thus established, which it is intended shall have its level visible thru or above the side openings 2. If air is leaking past in the tire valve stem 12, such leakage will be evidenced by the air rising as bubbles thru the water. Visible indication is thus given of the leaky condition of the tire valve.

The flexible tube 11 permits convenient use of the leak detector even if the tire valve stem is pointing downward when the test is to be made, as the flexible nature of this tube 11 permits the same to be turned so that the casing 1 is upright and above the valve in the tire, it being essential that the casing 1 be upright in order to cause the air bubbles to pass thru the water. With the casing inverted, which would result if the flexible tubing were not provided, no test could be made until the wheel with the tire had been adjusted so that the valve stem was pointing upwardly.

Claims:

1. A valve leak detector, comprising a casing adapted to contain water and thru which the water column is visible, a conduit leading from the casing and adapted to be connected with the stem of a tire valve, a valve in the casing to control the admission of water to said conduit, said conduit being in part flexible.

2. A valve leak indicator, comprising a casing having side openings, a glass lining therefor, an outlet therefrom, a manually operable valve controlling outlet, and a length of flexible tubing connected to said outlet.

In testimony whereof I affix my signature.

MARTIN J. CLAUSEN.